United States Patent
Apostolos et al.

(10) Patent No.: US 7,642,963 B2
(45) Date of Patent: Jan. 5, 2010

(54) SOLDIER/GROUND VEHICLE PASSIVE RANGING SYSTEM UTILIZING COMPACT SPATIOTEMPORAL PROCESSOR

(75) Inventors: John T. Apostolos, Lyndeborough, NH (US); Ronald M. Yannone, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/380,909

(22) Filed: Mar. 5, 2009

(65) Prior Publication Data

US 2009/0195454 A1 Aug. 6, 2009

Related U.S. Application Data

(62) Division of application No. 12/008,005, filed on Jan. 8, 2008.

(60) Provisional application No. 60/879,223, filed on Jan. 8, 2007.

(51) Int. Cl.
*G01S 3/02* (2006.01)
(52) U.S. Cl. .................................................. 342/375
(58) Field of Classification Search ................ 342/375, 342/373, 423–424, 443, 445, 452, 463, 465
See application file for complete search history.

(56) References Cited

U.S. PATENT DOCUMENTS

| | | | |
|---|---|---|---|
| 4,212,067 A | | 7/1980 | Henderson |
| 4,646,099 A | * | 2/1987 | Apostolos .................. 342/375 |
| 4,688,046 A | | 8/1987 | Schwab |
| 5,923,294 A | * | 7/1999 | Bacelon et al. ............. 342/457 |
| 6,771,224 B2 | * | 8/2004 | Apostolos .................. 343/718 |

OTHER PUBLICATIONS

R. C. Madge et al., Power line carrier emissions from transmission lines, IEEE Transactions of Power Delivery, vol. 7(4), p. 1775-1785, Oct. 1992.
Systems Interface wins major NDB Contract in Egypt, Systems Interface Press Release, Sep. 2004.
G. L. Squires, Practical Physics, 3rd edition, Cambridge University Press, p. 7 and 35-38, 1985.

* cited by examiner

*Primary Examiner*—Thomas H Tarcza
*Assistant Examiner*—Fred H Mull
(74) *Attorney, Agent, or Firm*—Daniel J. Long; Robert K. Tendler (57) ABSTRACT

A method of two-source passive ranging comprising the steps of determining the coordinates of a first position and a second position wherein a first soldier or ground vehicle is located at the first position and a second soldier or ground vehicle is located at the second position; determining individual angles between said first and second positions and a radio frequency source; and using individual single-angle accuracy values to estimate the range from the first and second positions to the radio frequency source.

7 Claims, 6 Drawing Sheets

SOLDIER/GROUND VEHICLE PASSIVE RANGING SYSTEM UTILIZING COMPACT SPATIOTEMPORAL PROCESSOR

CROSS-REFERENCE TO RELATED APPLICATION

This Application is a Divisional Application of U.S. application Ser. No. 12/008,005 filed Jan. 8, 2008, and claims rights under 35 USC § 119(e) from U.S. Application Ser. No. 60/879,223 filed Jan. 8, 2007, the contents of which are incorporated herein by reference.

BACKGROUND OF THE INVENTION

1. Field of the Invention

The present invention relates to electronic warfare (EW) and more particularly to methods and apparatus for providing ranging between soldiers or ground vehicles.

2. Brief Description of Prior Developments

The prior art discloses various methods and apparatus for ranging between soldiers on the ground or other uses of ranging in a military environment.

U.S. Pat. No. 4,409,899, for example, discloses an acoustic target sensor and ranging system automatically detects military targets and provides a munition firing signal at the appropriate target position and time. An amplitude-doppler circuit is utilized to predict the time of closest approach to a munition by a target by measuring the time interval between zero crossings of the second and third derivatives of the received acoustic wave amplitude function. The circuit produces a firing signal by logically ANDing the closest point of approach signal it develops with a signal that indicates when target range is within specified limits. The circuit is realized by means of conventional electronic zero crossing detectors, an up-down counter, dividers, sample and hold devices and voltage comparators. The acoustic target signal is obtained from an omni-directional microphone the output of which is amplified and rectified.

U.S. Pat. No. 5,751,830 discloses a coherent camera system performs ranging, spectroscopy, and thermal imaging. Local oscillator radiation is combined with target scene radiation to enable heterodyne detection by the coherent camera's two-dimensional photodetector array. Versatility enables deployment of the system in either a passive mode (where no laser energy is actively transmitted toward the target scene) or an active mode (where a transmitting laser is used to actively illuminate the target scene). The two-dimensional photodetector array eliminates the need to mechanically scan the detector. Each element of the photodetector array produces an intermediate frequency signal that is amplified, filtered, and rectified by the coherent camera's integrated circuitry. By spectroscopic examination of the frequency components of each pixel of the detector array, a high-resolution, three-dimensional or holographic image of the target scene is produced for applications such as air pollution studies, atmospheric disturbance monitoring, and military weapons targeting.

U.S. Pat. No. 5,801,866 discloses a portable laser communication transceiver for transmitting and receiving information imposed on laser beams. A communication signal is imposed on a laser beam having a divergence of between 1 degree and 4 degrees. The beam is directed by an operator, sighting through a telescopic viewing device, at a distant transceiver which collects light in the laser beam with a. In preferred embodiments, the transceivers are handheld and each comprises a microphone and earphones allowing operators to talk with each other. Digital information can also be transmitted from personal computers and other electronic information equipment at the location of each operator. In a preferred embodiment useful for military and surveying applications, a GPS, a compass and a laser ranging system is provided. This enables the operator to sight through a binocular to a target and determine its position in longitude, latitude and elevation. Target position information can then be transmitted to a distant transceiver which in this case could be a base transceiver.

U.S. Pat. No. 6,989,783 discloses a continuous wave ranging system, comprising a modulator for modulating an r.f. carrier wave in accordance with a pseudo-random code, a transmitting antenna for radiating the modulated signal towards a target, a receiving antenna and receiver for detecting the signal reflected back from the target, a correlator for correlating the reflected signal with a transmitted code with a selected phase shift corresponding to the current range gate to be tested, and means for processing the range/amplitude data from the correlator to discriminate between reflections due to the target and those due to other objects adjacent to the target.

A need, however, still exists for methods and apparatus for providing passive range to local RF emitters on the battlefield available to foot soldiers or unmanned ground vehicles.

SUMMARY OF INVENTION

The present invention is a two-source passive ranging system that exploits the DF measurements from two separated sources (two soldiers, two vehicles, or a soldier/vehicle pair) to provide passive range and 1-sigma range to the RF source to each sensor (soldier or vehicle) by fusing the time-coincident DF (angle) measurements from the two sensors that are separated by a base-leg distance. The soldiers/vehicles, equipped with GPS equipment, know their local coordinates and these coordinates can be used to compute the base-leg distance between them and the approximate angular orientation of this base-leg with respect to a local coordinate system grid. The (a) base-leg, (b) the individual DF angle measurements, and (c) the individual 1-sigma angle (DF) accuracy values are used to estimate the range from each soldier to the RF source, as well as the corresponding 1-sigma range accuracy values.

Figure 1:
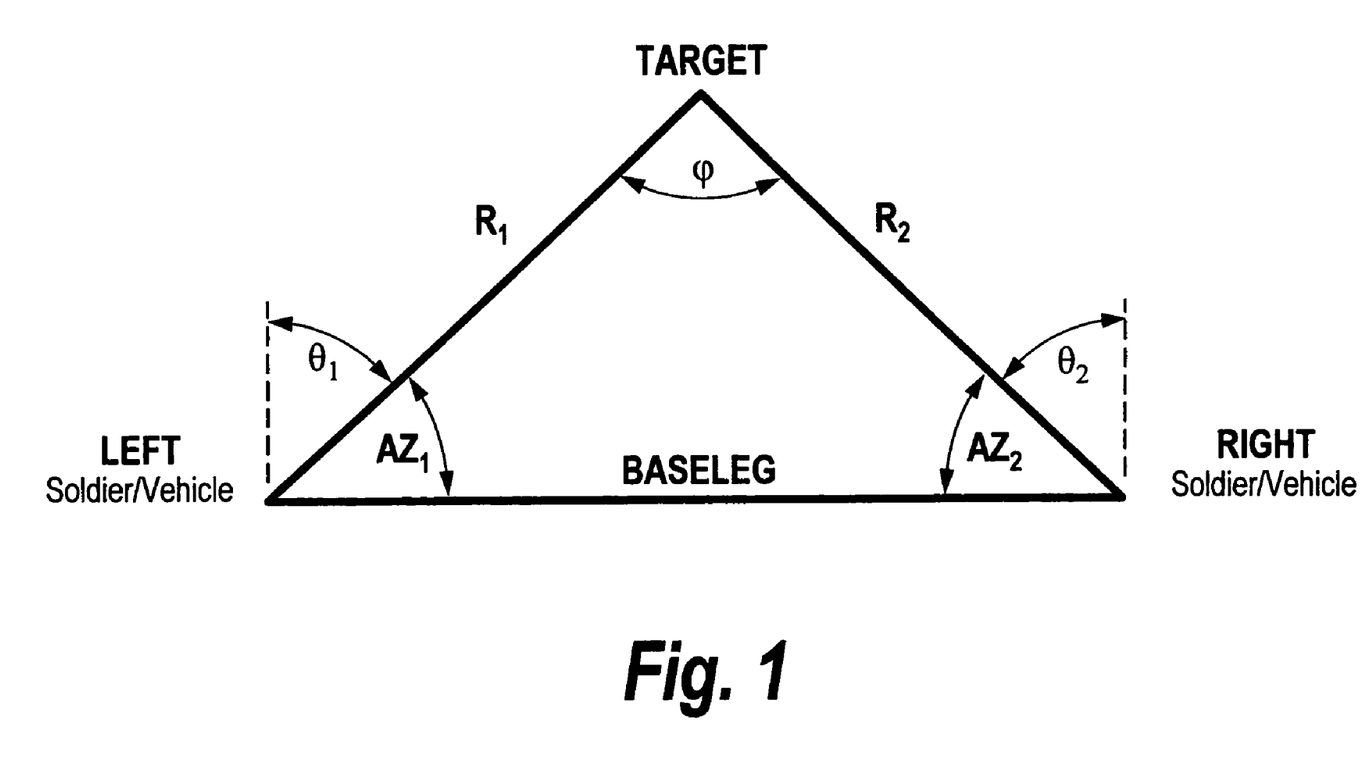
FIG. 1 is a schematic drawing illustrating a preferred embodiment of the method of the present invention.

The Two-Source Passive Ranging System and its companion "geometry" are shown in FIG. 1. An example set of percent range error (PRE) values for azimuth measurements measured with respect to the LEFT soldier are summarized in Table 1 below. The RMS percent range error over the $AZ_1$ region of interest (20 to 90 degrees) is about 3.6% and 7.2% for the nominal 1-sigma angle (DF) measurement accuracies of 1.5 and 3 degrees, respectively.

This PRE performance can allow the soldiers/vehicles to avoid a follow-on weapon fired at either soldier, allow them to "direct" fire power back to the RF source, or simply "bookmarking" the RF source DF and range data.

TABLE 1

Percent Range Error (PRE) for Two-Source Passive Ranging System for the Soldier/Vehicle Cooperating Ranging System

| $AZ_1$ (deg) w.r.t. the | 1-sigma DF Accuracy (degrees) | |
|---|---|---|
| LEFT Soldier | 1.5 | 3 |
| 20 | 1 | 2 |
| 30 | 1.6 | 3.14 |
| 40 | 2.13 | 4.3 |

TABLE 1-continued

Percent Range Error (PRE) for Two-Source Passive Ranging
System for the Soldier/Vehicle Cooperating Ranging System

| AZ$_1$ (deg) w.r.t. the LEFT Soldier | 1-sigma DF Accuracy (degrees) | |
|---|---|---|
| | 1.5 | 3 |
| 50 | 2.73 | 5.5 |
| 60 | 3.4 | 6.8 |
| 70 | 4.10 | 8.2 |
| 80 | 4.91 | 9.8 |
| 90 | 5.9 | 11.7 |
| RMS Percent Range Error | 3.6% | 7.2% |

Soldier/Vehicle separation = 500 feet = base-leg
Range to RF Source w.r.t. LEFT soldier = 500 feet
1-sigma DF accuracy = 1.5 and 3 degrees Examining a typical 500-foot spacing between two soldiers (or two vehicles or a soldier/vehicle pair) and nominal angle (DF) measurements and 1-sigma measurement accuracy of 3 and 1.5 degrees, for battlefield emitters of 500 feet, the RMS percent range error (PRE) using the LEFT soldier's body-worn-antenna sensor, for the full spread of values for AZ$_1$, between [20 to 90 degrees] is 7.2 and 3.6 percent, respectively. This performance allows the soldier(s) to either "book-mark" or engage (avoid, direct local firepower) in the direction of the RF source to thwart/destroy the human associated with the RF source.

By the Law of Sines, $$\frac{R_1}{\sin(AZ_2)} = \frac{BASELEG}{\sin(\phi)} = \frac{R_2}{\sin(AZ_1)}$$

$$R_{1,2} = \frac{BASELEG \cdot \sin(AZ_2, AZ_1)}{\sin(\phi)}$$

with ø=180−(AZ$_1$+AZ$_2$). So AZ$_{1,2}$=90−θ$_{1,2}$ $$R_{1,2} = \frac{BASELEG \cdot \sin(AZ_2, AZ_1)}{\sin(\phi)}$$

The soldiers' sensors typically measure θ$_{1,2}$ but the analysis uses AZ$_{1,2}$.

$$PRE = \frac{100 \cdot \sigma_{AZ_1} \sqrt{\left(\left(\cos(AZ_1) - \frac{BASELEG}{R_1}\right)^2 + \sin^2(AZ_1)\right)^2 + \left(1 - \frac{BASELEG}{R_1} \cdot \cos(AZ_1)\right)^2}}{\frac{BASELEG}{R_1} \cdot \sin(AZ_1)}$$

BRIEF DESCRIPTION OF THE DRAWINGS

The present invention is further described with reference to the accompanying drawings wherein.

DETAILED DESCRIPTION OF THE PREFERRED EMBODIMENT

Currently, the problem of providing real-time signal detection information with spatial discrimination is solved with large antenna arrays and signal processing that requires a large processor/beamformer. The resulting information, which is a function of frequency, azimuth and elevation is then used to determine the location and the nature of an RF emitter. The size, weight, and power required by current approaches is a severe constraint on the concept of operations. According to the method of this invention, a wide band of frequencies is used to simultaneously provides real-time frequency and spatial discrimination, while remaining robust to cochannel and jamming interference, in a small, efficient, low-power form factor.

Figure 2:
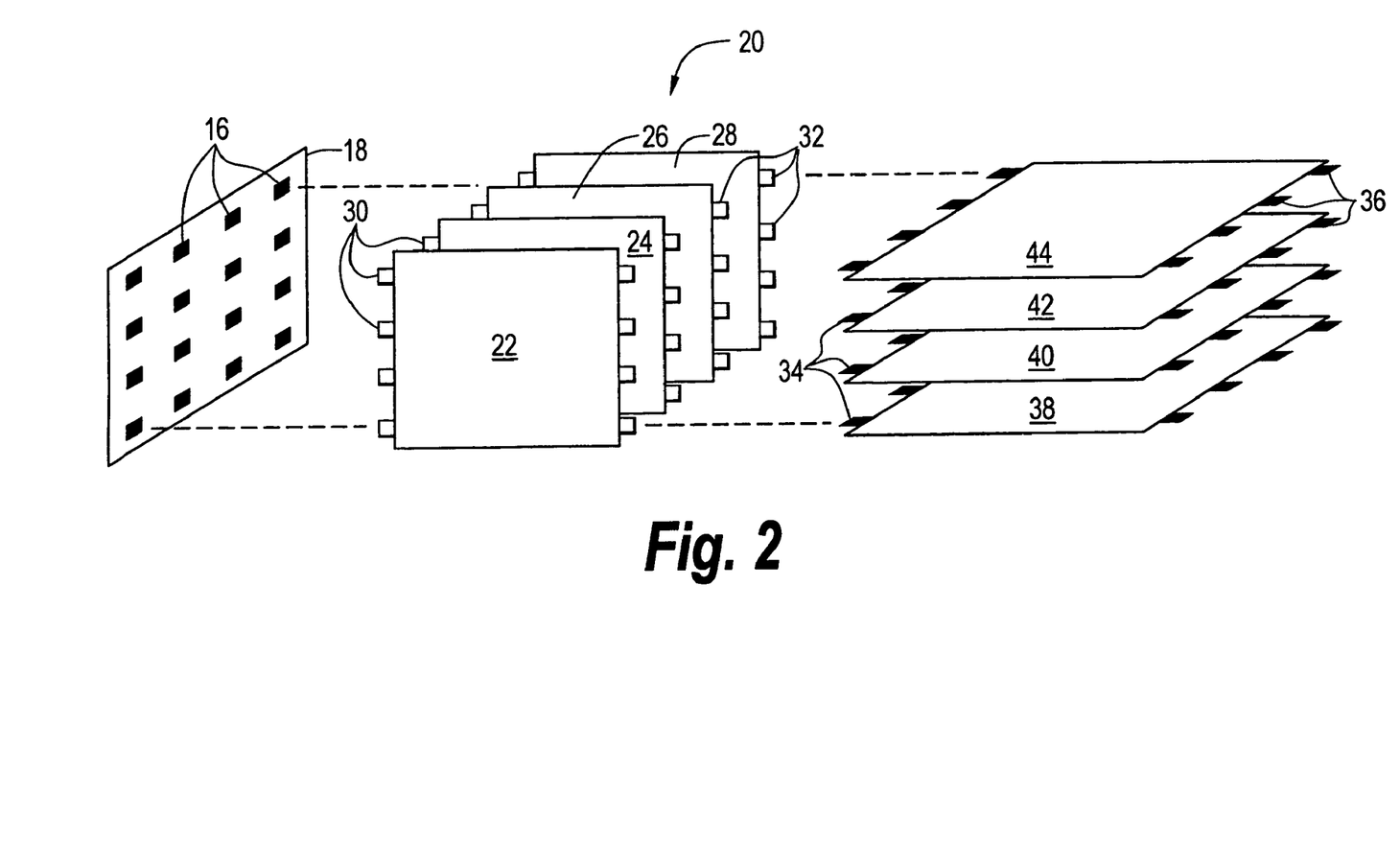
FIG. 2 is a schematic drawing illustrating 3-D Fourier transform architecture.

The concept of processing the output of a planar antenna array with an inexpensive, small, passive, device to obtain simultaneous spatial beams and frequency spectra over both a wide field of view and wide bandwidth is a compelling idea. The architecture for such a device is shown in FIG. 2. The device is, in effect, a 3-D Fourier transform processor. Patents on the 3-D concept, as well as a related 2-D concept, were issued in 1987, "Two dimensional transform utilizing ultrasonic dispersive delay line," U.S. Pat. No. 4,649,392; and "Three dimensional Fourier transform device" U.S. Pat. No. 4,646,099, the contents of which are incorporated herein by reference. These concepts utilized ultrasonic media, and although one such 2-D transform device was fabricated and tested, the problems associated with transducer loss and propagation loss were very hard to overcome. The four following developments may be of interest to one skilled in the art who may practice this invention:

1) The conversion of the ultrasonic beamforming structure to an all electromagnetic solution utilizing a form of dispersive Rotman lens called the beamforming dispersive delay line (BFDDL), as disclosed in W. Rotman and R. F Turner, "Wide-Angle Microwave Lens for Line Source Applications," *IEEE Transactions on Antenna Propagation*, vol AP-11, November 1963; and P. S Hall and S. J. Vetterlein, "Review of radio frequency beamforming techniques for scanned and multiple beam antennas," *IEEE Proceedings on Microwaves, Antennas and Propagation*, Volume 137, Issue 5, October 1990, the contents of which are incorporated herein by reference.

2) The use of meta-materials with engineered dispersive properties, as is disclosed in G. V. Eleftheriades and A. Grbic, "Dispersion analysis of a microstrip-based negative refractive index periodic structure," *IEEE Microwave and Wireless Components Letters*, Vol 13, No 4. April, 2003, the contents of which are incorporated herein by reference.

3) The fabrication techniques associated with 3-D Micro Electromagnetic Radio Frequency Systems (3-D MERFS), as is described at www.darpa.mil/mto/programs/3dmerfs/index.html.
4) Technology for Frequency Agile Digitally Synthesized Transmitters (TFAST technology), as is described at www.darpa.mil/mto/programs/tfast/index.html.

Combat systems are often limited in their performance by cochannel interference and jamming. The proposed architecture addresses the issue of size, weight and power as well as providing robustness to interference. Because the architecture provides spatially discriminated frequency spectra in a small form-factor, it is expected to be a key enabler to providing capabilities to small platforms such as Unmanned Aerial Vehicles (UAVs). Secondary system applications that are of interest include a portable system that would enhance the situational awareness of dismounted personnel, a "flexible transmitter" multiplexer that will direct multiple signals at different frequencies to different spatial locations, or, more simply, an inexpensive beamsteering device that facilitates robust networked wireless communications.

Passive 3-D Fourier Transform Architecture

Referring to FIG. 2, the 3-D transform architecture in combination with an input sensor consisting of a 2-D 4×4 planar antenna array is shown.

The output matrix elements correspond to azimuth and elevation angle of arrival beams (spatial frequencies). The frequency spectrum (temporal frequencies) associated with this angle of arrival is read out in time from the output matrix elements.

The spatial frequencies are decomposed by parallel/orthogonal planar 2-D beamforming structures 20, 36; while the temporal frequencies are decomposed via a chirp Fourier transform integrated into the beamforming structures, utilizing the engineered dispersion embedded in the 2-D beam forming structures. The chirp synthesis and chirp insertion can be accomplished utilizing TFAST technology. The three dimensional content of the output matrix is depicted in FIG. 3 for the cases of angles of arrival (0,0) and (45,45) degrees.

Chirp Fourier Transform

It is prudent at this point to digress and review the chirp Fourier transform methodology and how it is integrated into the beamforming structures.

Figure 3:
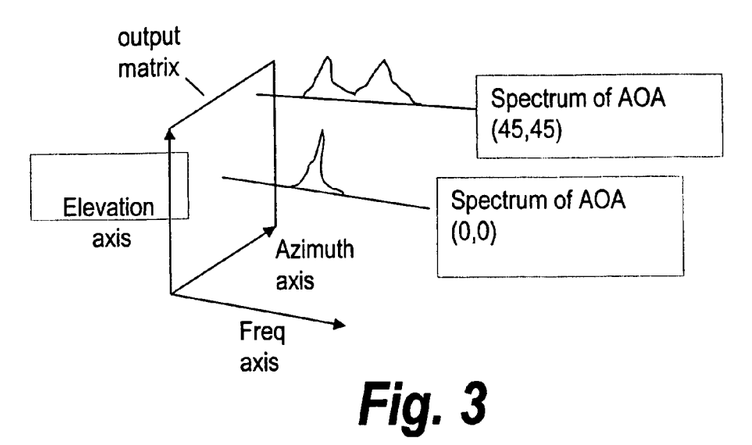
FIG. 3 is a schematic drawing illustrating typical 3-D output in the architecture shown in FIG. 2.

Referring to FIG. 3, the input spectrum, composed of a multiplicity of sinusoids, is multiplied by a linear chirp. The waveform resulting from the multiplication of the chirp with a particular sinusoid is another chirp with a translated time versus frequency characteristic. The extent of the translation depends directly on the frequency of the sinusoid. Since the dispersive delay line is designed to be a matched filter for the chirp, the output of the dispersive delay line is a multiplicity of impulse functions. The position in time and the amplitude of the various impulse functions represent the frequency and amplitude respectively of the input sinusoids. A dispersive delay line (DDL) suitable for use in the microwave/millimeter wave range is comprised of a dielectric spiral strip mounted on a conducting plane. By proper tapering of the strip thickness, an extremely linear group delay versus frequency is achievable. The HE11 mode is dispersive when the thickness of the layer is about 0.5 wavelength as disclosed in "Compressive receiver," U.S. Pat. No. 5,029,235; and "Electromagnetic dispersive delay line," U.S. Pat. No. 4,808,950, the contents of which are incorporated herein by reference. Bandpass functions are built into the DDL's. The chirp can be generated using TFAST direct digital synthesis techniques.

BFDDL (BeamForming Dispersive Delay Line) Structure

Figure 4:
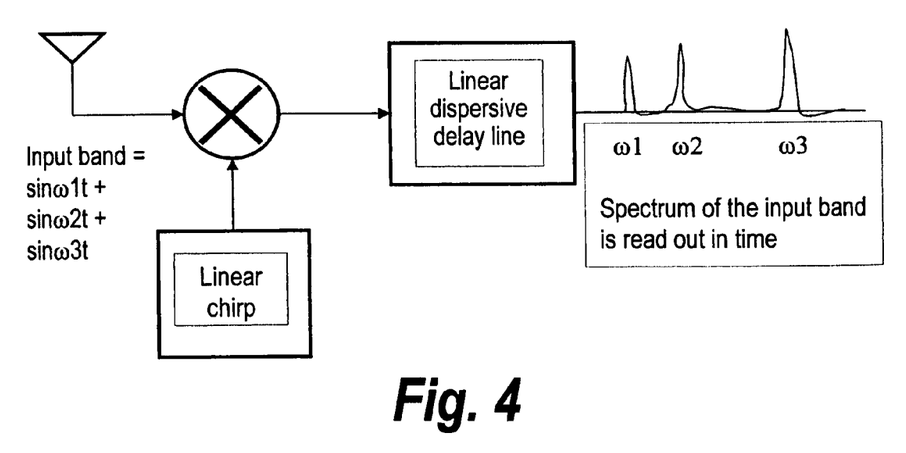
FIG. 4 is a schematic block diagram illustrating classical chirp Fourier transform.
Figure 5:
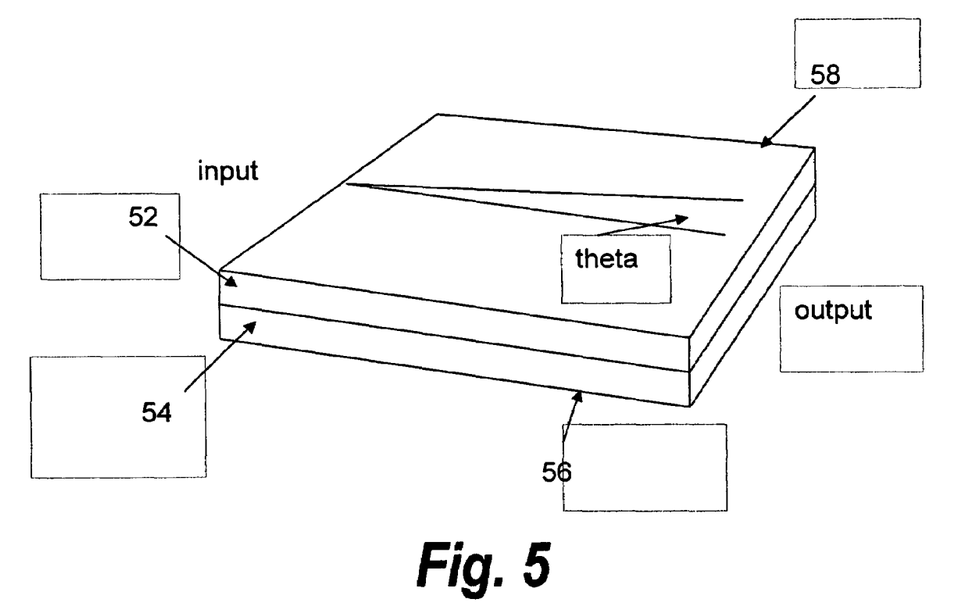
FIG. 5 is a perspective view of a BFDDL structure used in a preferred embodiment of the method of the present invention.
Figure 6:
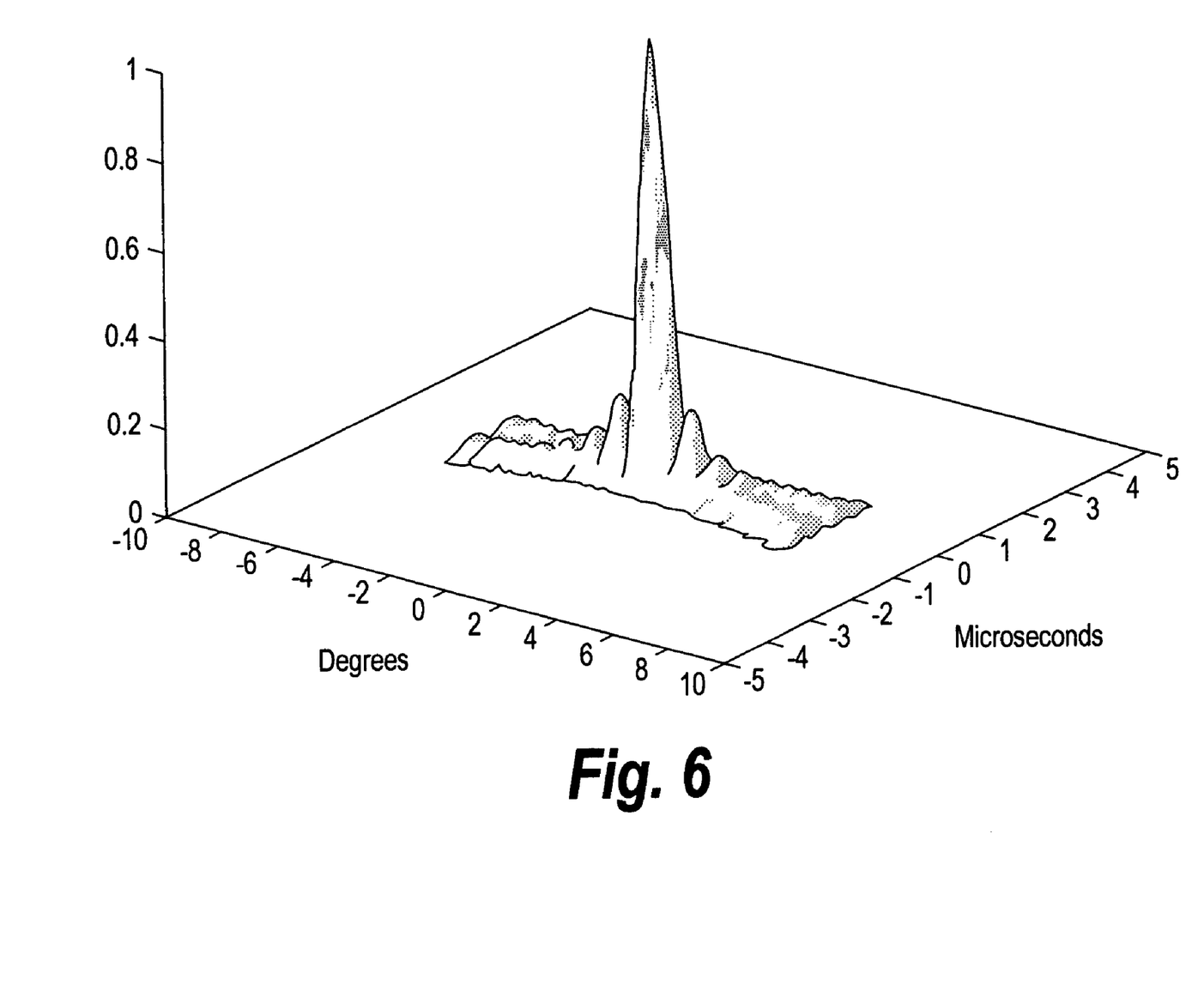
FIG. 6 is a graph showing the BFDDL field along the output edge due to incident field at 0 degrees.
Figure 7:
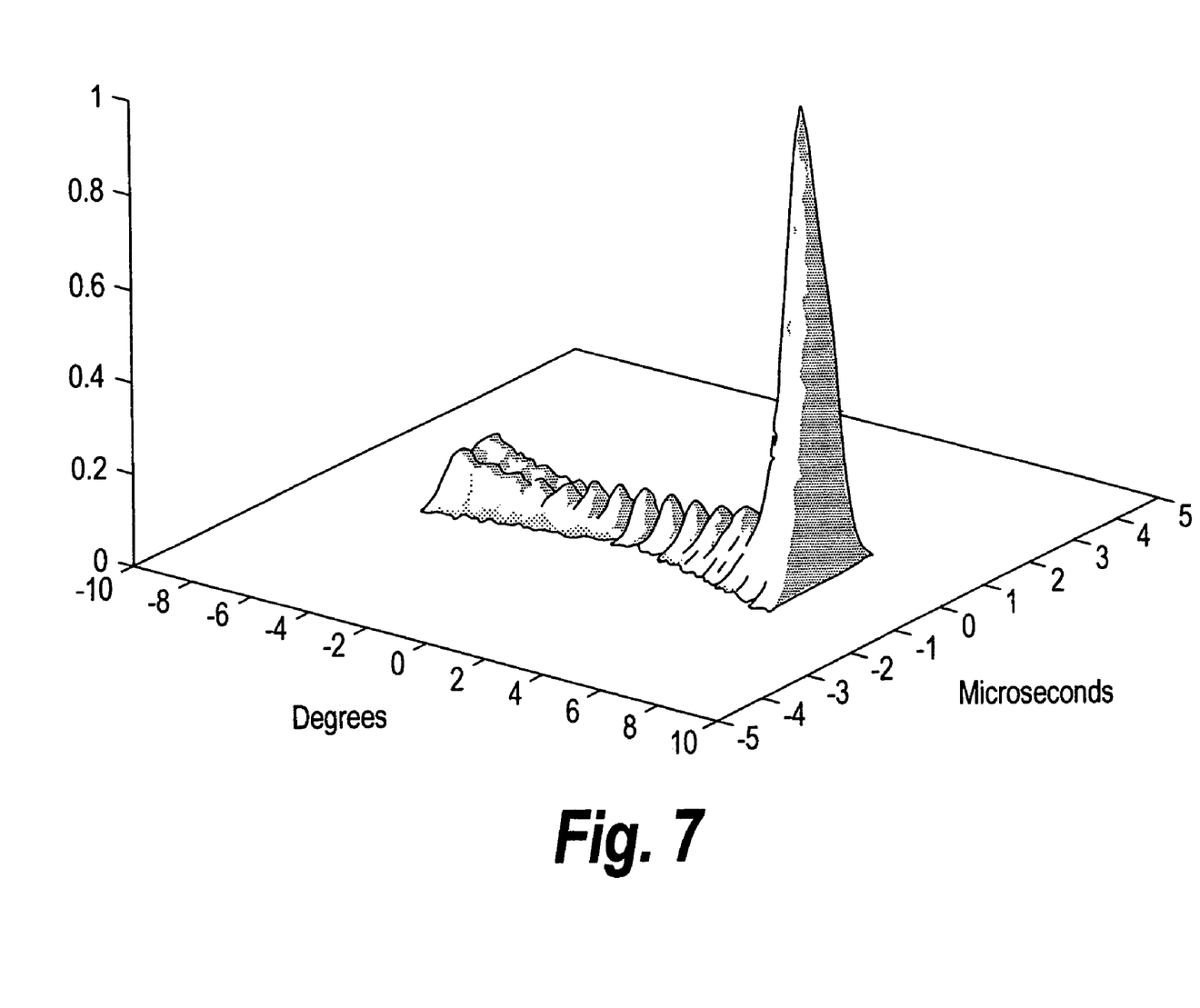
FIG. 7 is a graph showing the BFDDL field along the output edge due to incident field at 45 degrees, according to a preferred embodiment of the method of the present invention.

The classical chirp Fourier transform represented in FIG. 4, an input line 46 and a linear chirp 48 employ a single input/output dispersive delay line 50. It is possible to create a multiple input/output dispersive delay line with a flat composite layer of high/low dielectric material sandwiched between metallic boundaries as shown in FIG. 5. Referring to FIG. 5, there is a low dielectric constant material 52, a metamaterial layer 54, and conductors 56 and 58. The dispersion in the BFDDL structure for the dominant HE01 mode has a wideband linear range as disclosed in "Traveling Wave Antennas," C.H. Walter, the contents of which are incorporated herein by reference. The use of metamaterials allows the engineering of precise dispersive characteristics of the layer to achieve a very high two-tone high dynamic range.

By employing an array of transducers, e.g., TE 01 waveguides or horns, along the input and output sides in a Rotman-lens configuration, the integration of the signal processing function with the antenna beamforming structure is effected. The BFDDL transfer function approaches that of a 2-D Fourier transform.

An analysis of a BFDDL structure assuming linear dispersion enables the derivation of a first order model. If there are m input transducers, then the field along the output edge, to first order for a sinusoidal emitter at angle of arrival θaoa is:

$$E = C \exp(-\gamma t^2) \sin(m/2\Psi)/\sin(\Psi/2)$$

The integration of the temporal signal processing with the spatial antenna beamforming is seen in the two multiplicative functions above. The sine/x function is the pattern of a linear phased array, while the gaussian exponential function is the compressed pulse associated with chirp Fourier transform output (the emitter frequency is mapped to t=0).

C is a complex constant, γ is a constant having to do with the processing gain of the chirp Fourier transform, $\Psi = 2\pi D\theta - 2\pi S \sin(\theta_{aoa})$ where D is the transducer spacing in beam forming wavelengths, S is the antenna array spacing in free space wavelengths, and $\theta_{aoa}$ is the angle of arrival of the incident wave. Inspection of the above equation reveals a function which peaks in time at t=0 and peaks along the beamforming structure edge at Ψ=0. FIGS. 4 and 5 show the output function "E" along the edge of a 16-element beamforming structure for two cases; 0 degrees AOA and 45 degrees AOA. Any losses in the BFDDL should be compensated for by antenna array gain and CFT compression gain.

Practical Implementation

By using a high dielectric constant material such as barium tetratitanate with an embedded metamaterial cell structure, one should be able to tailor a wideband linear dispersion. The variables of layer thickness and cell size/spacing may allow sufficient degrees of freedom to create the desired characteristics. Other variables such as the internal structure of the cell can be invoked. The 3-D processor with a center frequency of 15 GHz and an 8×8 planar array has a projected size of 3×3×6 inches. The frequency bins would be 20 mhz with the instantaneous bandwidth equal to 10 GHz. Other 10 GHz bands could be covered by changing the center frequency of the chirp. This design should be scalable to higher frequencies with a corresponding reduction in size.

Digital Implementation Comparison

The 3-D processor provides 64 spatial beams, each with 512 10 MHz frequency bins. A digital version of the 3-D processor would require 64 20 GHz, 12 bit A/D converters. The digital beamforming would require 64 complex multiply—adds at a 20 GHz rate. The FPGA count, utilizing a Vertex 11, is 3200, assuming that the Vertex 11 does a 512 complex FFT in about 5 microseconds. This kind of implementation is clearly not tenable if size, power and cost are factors. Application scenarios for the methods and applications of this invention are as follows.

Sigint/Elint Processing Application

If one sums up all the available frequency bins and spatial beam bins, assuming there are 1000 frequency bins and 256 spatial beam bins, one is faced with a formidable processing problem, especially if the objective is to provide an emitter search function over all the bins (256,000 of them) in real time (100 ns). An efficient way to accomplish this task is to use a bank of 256 analog adaptive signal presence indicators. The CPU will keep track of where there are signals present, where the signals move, and when/where new signals appear. Such a system requires an interval of "start up" time to reach a steady state where all the existing signals have been catalogued. Once this steady state has been reached, one skilled in the art will look for changes. As new (or modified) signals appear, a means to analyze and classify the new signals is necessary to create the catalogue of signals. This step is efficiently accomplished by using a so-called Virtual Analysis Receiver (VAR) as is disclosed in "Compressive Receiver," U.S. Pat. No. 4,305,159, the contents of which are incorporated herein by reference. When a new signal is detected, the VAR is sent to the bin where the new signal has been detected, and proceeds to analyze the signal. This step would usually require a "set on" receiver, but since all the information about the signal is present in the periodically sampled frequency bins, the VAR is sufficient to analyze or demodulate the signal. The VAR is a time gate combined with a bandpass filter with a bandwidth approximately equal to that of the frequency bins. This function provides output similar to that of a real set on receiver with the same analysis bandwidth.

Flexible Transmitter Applications

Since the 3-D transform device is reversible, one could inject the spectrum of a desired waveform into an element of the output matrix (FIG. 2). This would result in the desired signal being transmitted in the direction represented by the matrix element. In fact, a multiplicity of different signals could be transmitted simultaneously.

Enhance Performance of Existing Systems

The passively obtained beamforming information then be used by the front end to improve the performance of the analog to digital converter, by providing it with a signal contained less clutter and by providing it with information about the expected dynamic range of the signal of interest. The same (passively obtained) information could be used as an initial geolocation estimate that can be refined by further signal processing. The initial estimate would reduce the amount of processing resources (time, power, Mips) required by higher complexity algorithms, allowing faster and cheaper geolocation/tracking estimates.

Man-Portable Situational Awareness

The expected size, weight and power of the passive analog signal processing (PASP) device are low enough that the device and an interface could be combined in a wearable/ carry-able form that would enhance the situational awareness of dismounted personnel without significantly increasing the weight carried. For instance, the interface could alert the wearer of the presence of unexpected or threatening RF signals, and could provide angle of arrival and tracking information for the detected threat.

Simultaneous Multiple Signal Transmission

Alternatively, when used as part of a transmitter front-end, the method can be used as a "flexible transmitter" multiplexer that will direct multiple signals at different frequencies to different spatial locations. This could be used, for instance, when information must be transmitted to multiple radios in different locations, operating at different frequencies, or it could be used to enhance the throughput of a network.

Robust Networked Multiple Access Communications

One problem with mobile-networked communications is that the multiple signals interfere with one another and a flexible media access protocol must be used to reduce the interference. Performing beamsteering between mobile nodes can be difficult and expensive in terms of processing resources. The passively obtained information from the PASP device can be used as an inexpensive beamsteering approach that facilitates robust networked wireless communications.

Code useful in a preferred embodiment of this invention is shown in Appendix "A".

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

APPENDIX A

Preferred Two-Source Ranging System Runs 1.5-degree sigma_AZ Cases

>>twopt _2_3_03 use azimuth angles between 0 and 180 deg in program runs range (nm) and azimuth(deg) from ship #1 ??500/6076 20 enter platform separation in nm !500/6076 enter std. dev. of first and second AOA meas. error (deg) !!3 3 Calculation via standard Cramer-Rao Matrix Algebra: std. dev of % range error=2.06 std. dev of az. Error=3.00 deg Direct Calculation from Formula: std. dev of % range error=2.06 std. dev of az. Error=3.00 deg >>twopt _2_3_03 use azimuth angles between 0 and 180 deg in program runs range (nm) and azimuth(deg) from ship #1 !!500/6076 30 enter platform separation in nm !500/6076 enter std. dev. of first and second AOA meas. error (deg) !!3 3 Calculation via standard Cramer-Rao Matrix Algebra: std. dev of % range error=3.14 std. dev of az. Error=3.00 deg Direct Calculation from Formula: std. dev of % range error=3.14 std. dev of az. error=3.00 deg >>twopt _2_3_03 use azimuth angles between 0 and 180 deg in program runs range (nm) and azimuth(deg) from ship #1 !!500/6076 40 enter platform separation in nm !500/6076 enter std. dev. of first and second AOA meas. error (deg) !!3 3 Calculation via standard Cramer-Rao Matrix Algebra: std. dev of % range error=4.26 std. dev of az. error=3.00 deg Direct Calculation from Formula: std. dev of % range error=4.26 std. dev of az. Error=3.00 deg >>twopt _2_3_03 use azimuth angles between 0 and 180 deg in program runs range (nm) and azimuth(deg) from ship #1 !!500/6076 50 enter platform separation in nm !500/6076 enter std. dev. of first and second AGA meas. error (deg) !!3 3 Calculation via standard Cramer-Rao Matrix Algebra: std. dev of % range error=5.46 std. dev of az. Error=3.00 deg Direct Calculation from Formula: std. dev of % range error=5.46 std. dev of az. error=3.00 deg >>twopt _2_3_03 use azimuth angles between 0 and 180 deg in program runs range (nm) and azimuth(deg) from ship #1 !!500/6076 60 enter platform separation in nm !500/6076 enter std. dev. of first and second AOA meas. error (deg) !!3 3 Calculation via standard Cramer-Rao Matrix Algebra: std. dev of % range error=6.76 std. dev of az. error=3.00 deg Direct Calculation from Formula: std. dev of % range error=6.76 std. dev of az. Error=3.00 deg >>twopt _2_3_03 use azimuth angles between 0 and 180 deg in program runs range (nm) and azimuth(deg) from ship #1 !!500/6076 70 enter platform separation in nm !500/6076 enter std. dev. of first and second AOA meas. error (deg) !!3 3 Calculation via standard Cramer-Rao Matrix Algebra: std. dev of % range error=8.20 std. dev of az. Error=3.00 deg Direct Calculation from Formula: std. dev of % range error=8.20 std. dev of az. Error=3.00 deg >>twopt _2_3_03 use azimuth angles between 0 and 180 deg in program runs range (nm) and azimuth(deg) from ship #1 !!500/6076 80 enter platform separation in nm !500/6076 enter std. dev. of first and second AOA meas. error (deg) !!3 3 Calculation via standard Crainer-Rao Matrix Algebra: std. dev of % range error=9.82 std. dev of az. Error=3.00 deg Direct Calculation from Formula: std. dev of % range error=9.82 std. dev of az. error=3.00 deg >>twopt _2_3_03 use azimuth angles between 0 and 180 deg in program runs range (nm) and azimuth(deg) from ship #1 !!500/6076 90 enter platform separation in nm !500/6076 enter std. dev. of first and second AOA meas. error (deg) !!3 3 Calculation via standard Cramer-Rao Matrix Algebra: std. dev of % range error=11.71 std. dev of az. Error=3.00 deg Direct Calculation from Formula: std. dev of % range error=11.71 std. dev of az. Error=3.00 deg 3-degree sigma_AZ Cases >>twopt _2_3_03 use azimuth angles between 0 and 180 deg in program runs range (nm) and azimuth(deg) from ship #1 !!500/6076 20 enter platform separation in nm !500/6076 enter std. dev. of first and second AOA meas. error (deg) !!1.5 1.5 Calculation via standard Cramer-Rao Matrix Algebra: std. dev of % range error=1.03 std. dev of az. Error=1.50 deg Direct Calculation from Formula: std. dev of % range error=1.03 std. dev of az. error=1.50 deg >>twopt _2_3_03 use azimuth angles between 0 and 180 deg in program runs range (nm) and azimuth(deg) from ship #1 !!500/6076 30 enter platform separation in nm !500/6076 enter std. dev. of first and second AOA meas. error (deg) !!1.5 1.5 Calculation via standard Cramer-Rao Matrix Algebra: std. dev of % range error=1.57 std. dev of az. Error=1.50 deg Direct Calculation from Formula: std. dev of % range error=1.57 std. dev of az. Error=1.50 deg >>twopt _2_3_03 use azimuth angles between 0 and 180 deg in program runs range (nm) and azimuth(deg) from ship #1 !!500/6076 40 enter platform separation in nm !500/6076 enter std. dev. of first and second AOA meas. error (deg) !!1.5 1.5 Calculation via standard Cramer-Rao Matrix Algebra: std. dev of % range error=2.13 std. dev of az. error=1.50 deg Direct Calculation from Formula: std. dev of % range error=2.13 std. dev of az. error=1.50 deg >>twopt _2_3_03 use azimuth angles between 0 and 180 deg in program runs range (nm) and azimuth(deg) from ship #1 !!500/6076 50 enter platform separation in nm !500/6076 enter std. dev. of first and second AOA meas. error (deg) !!1.5 1.5 Calculation via standard Cramer-Rao Matrix Algebra: std. dev of % range error=2.73 std. dev of az. Error=1.50 deg Direct Calculation from Formula: std. dev of % range error=2.73 std. dev of az. Error=1.50 deg >>twopt _2_3_03 use azimuth angles between 0 and 180 deg in program runs range (nm) and azimuth(deg) from ship #1 !!500/6076 60 enter platform separation in nm !500/6076 enter std. dev. of first and second AOA meas. error (deg) !!1.5 1.5 Calculation via standard Cramer-Rao Matrix Algebra: std. dev of % range error=3.38 std. dev of az. error=1.50 deg Direct Calculation from Formula: std. dev of % range error=3.38 std. dev of az. Error=1.50 deg >>twopt _2_3_03 use azimuth angles between 0 and 180 deg in program runs range (nm) and azimuth(deg) from ship #1 !!500/6076 70 enter platform separation in nm !500/6076 enter std. dev. of first and second AOA meas. error (deg) !!1.5 1.5 Calculation via standard Cramer-Rao Matrix Algebra: std. dev of % range error=4.10 std. dev of az. error=1.50 deg Direct Calculation from Formula: std. dev of % range error=4.10 std. dev of az. Error=1.50deg >>twopt _2_3_03 use azimuth angles between 0 and 180 deg in program runs range (nm) and azimuth(deg) from ship #1 !!500/6076 80 enter platform separation in nm !500/6076 enter std. dev. of first and second AOA meas. error (deg) !!1.5 1.5 Calculation via standard Cramer-Rao Matrix Algebra: std. dev of % range error=4.91 std. dev of az. Error=1.50 deg Direct Calculation from Formula: std. dev of % range error=4.91 std. dev of az. Error=1.50 deg >>twopt _2_3_03 use azimuth angles between 0 and 180 deg in program runs range (nm) and azimuth(deg) from ship #1 !!500/6076 90 enter platform separation in nm !500/6076 enter std. dev. of first and second AOA meas. error (deg) !!1.5 1.5 Calculation via standard Cramer-Rao Matrix Algebra: std. dev of % range error=5.85 std. dev of az. error=1.50 deg Direct Calculation from Formula: std. dev of % range error=5.85 std. dev of az. error=1.50 deg >>

What is claimed is:

1. A method for locating an RF transmitting target involving a two source passive ranging system, comprising the steps of:

providing a first signal acquisition detector and analysis device at a first position and having an output that indicates the angle of arrival and elevation of a signal from an RF transmitting target associated with a catalog of all existing threat signals from targets, the device having a two-dimensional multi-element phased array having an output coupled to a basic analog processing element including two sets of two-dimensional beam forming surface electromagnetic dispersion delay lines forming dispersive Rotman Lenses, one set of delay lines stacked vertically relative to the phased array, a second set of two-dimensional beam forming dispersive delay lines coupled to the first set and stacked horizontally relative to the phased array, the analog process element being activated to periodically read out the spectrum of a band of interest in terms of the outputs of the horizontal dispersive delay lines, the outputs of the horizontal dispersive delay lines determining spatial and temporal frequencies from which the angle of arrival of all the signals in the band of interest and time of occurrence thereof can be derived;

a second signal acquisition detection and analysis device outputs identical to those of the first device, the second device being at a second position spaced from the first position along a base-leg for permitting triangulation to determine the geophysical location of the target; and, processing the outputs of the respective horizontally stacked dispersive delay lines of both signal acquisition detection and analysis devices so as to fuse the time-coincident angle of arrival measurements from the two sensors based on the base-leg separation distance using the analog processing element to output angles of arrival of threat signals in the catalog, whereby the angle of arrival of the RF transmitting target is ascertained for a threat signal in the catalog.

2. The method of claim 1, wherein a ground vehicle having the device is located at the first position.

3. The method of claim 2, wherein a ground vehicle having the device is located at the second position.

4. The method of claim 1, wherein a soldier having the device is located at the first position.

5. The method of claim 1, wherein a soldier having the device is located at the second position.

6. The method of claim 1, wherein the device is a handheld device.

7. The method of claim 6, wherein the handheld device is carried by a soldier for convenient battlefield target location.

* * * * *